United States Patent
Jung et al.

(10) Patent No.: US 11,370,458 B2
(45) Date of Patent: Jun. 28, 2022

(54) APPARATUS FOR DETERMINING THE STEERING INTENT OF A DRIVER, SYSTEM HAVING THE SAME, AND METHOD THEREOF

(71) Applicants: Hyundai Motor Company, Seoul (KR); Kia Motors Corporation, Seoul (KR)

(72) Inventors: Chang Young Jung, Seoul (KR); Keon Chang Lee, Hwaseong-si (KR); Chan Il Park, Yanggang-myeon (KR); Na Eun Yang, Hwaseong-si (KR); Dong Hwi Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 80 days.

(21) Appl. No.: 16/841,792

(22) Filed: Apr. 7, 2020

(65) Prior Publication Data
US 2021/0146960 A1 May 20, 2021

(30) Foreign Application Priority Data
Nov. 18, 2019 (KR) ........................ 10-2019-0147682

(51) Int. Cl.
| | |
|---|---|
| *B60W 30/10* | (2006.01) |
| *B60W 30/02* | (2012.01) |
| *B60W 50/10* | (2012.01) |
| *G05D 1/00* | (2006.01) |
| *B60W 60/00* | (2020.01) |

(52) U.S. Cl.
CPC ........ *B60W 60/0051* (2020.02); *B60W 30/02* (2013.01); *B60W 30/10* (2013.01); *B60W 50/10* (2013.01); *G05D 1/0061* (2013.01); *B60W 2510/202* (2013.01); *B60W 2520/06* (2013.01); *B60W 2520/14* (2013.01); *B60W 2540/00* (2013.01)

(58) Field of Classification Search
CPC ...... B60W 30/02; B60W 30/10; B60W 50/10; B60W 60/0051; B60W 2510/202; B60W 2520/06; B60W 2520/14; B60W 2540/00; G05D 1/0061
See application file for complete search history.

(56) References Cited

U.S. PATENT DOCUMENTS

| | | | |
|---|---|---|---|
| 10,078,331 B2 | 9/2018 | Kim et al. | |
| 2015/0120142 A1* | 4/2015 | Park | B60W 50/087 701/41 |

(Continued)

FOREIGN PATENT DOCUMENTS

| | | |
|---|---|---|
| KR | 101382279 B1 | 4/2014 |
| KR | 20150010435 A | 1/2015 |
| KR | 20180070401 A | 6/2018 |

*Primary Examiner* — Anshul Sood
(74) *Attorney, Agent, or Firm* — Slater Matsil, LLP

(57) ABSTRACT

An apparatus for deciding a steering intent of a driver is provided. The apparatus includes a processor configured to determine whether a driver intends to steer a vehicle based on sensing results of a stabilization state of a vehicle and whether a hand of the driver is positioned on a steering wheel of the vehicle, and a memory configured to store a preset reference value to determine the steering intent of the driver.

20 Claims, 3 Drawing Sheets

(56) References Cited

U.S. PATENT DOCUMENTS

| | | | |
|---|---|---|---|
| 2017/0235305 A1* | 8/2017 | Jung | B60W 50/082 |
| | | | 701/23 |
| 2018/0173225 A1 | 6/2018 | Kim et al. | |
| 2019/0054950 A1* | 2/2019 | Farhat | B62D 6/10 |
| 2019/0143983 A1* | 5/2019 | Hashimoto | G05D 1/0088 |
| | | | 701/23 |
| 2019/0286127 A1* | 9/2019 | Watanabe | B62D 15/025 |
| 2019/0300013 A1* | 10/2019 | Shiraishi | G05D 1/0061 |

* cited by examiner

APPARATUS FOR DETERMINING THE STEERING INTENT OF A DRIVER, SYSTEM HAVING THE SAME, AND METHOD THEREOF

CROSS-REFERENCE TO RELATED APPLICATIONS

This application claims priority to Korean Patent Application No. 10-2019-0147682, filed in the Korean Intellectual Property Office on Nov. 18, 2019, which application is hereby incorporated herein by reference.

TECHNICAL FIELD

The present disclosure relates to an apparatus for determining the steering intent of a driver, a system having the same, and a method thereof.

BACKGROUND

Recently, an intelligent vehicle has been developed to provide, for a driver, an automatic steering function such as an autonomous driving system. Such an intelligence vehicle assists, for example, driving in a transverse direction and automatically performs an operation, thereby increasing the safety and convenience of the driver.

The autonomous driving system having a subject (driver), which is different from an unmanned autonomous driving vehicle, controls the vehicle in transverse and longitudinal directions depending on the driver and a driving situation through a control system.

In a conventional autonomous driving system, when the steering force of the driver collides with the steering force of a system at the moment at which the autonomous driving system is initially activated, the autonomous steering system may be unintentionally deactivated or the starting of the autonomous driving may be restricted.

In other words, when a force is accidentally applied to a steering wheel even through the driver has no intention of manipulating the steering wheel during the autonomous driving of the vehicle, an autonomous driving control mode is withdrawn, so a dangerous situation may be caused.

SUMMARY

The present disclosure can solve above-mentioned problems occurring in the prior art while advantages achieved by the prior art are maintained intact.

The present disclosure relates to an apparatus (driver steering intent determining apparatus) for determining the steering intent of a driver, a system having the same, and a method thereof. Particular embodiments relate to a technology of determining the steering intent of a driver based on the behavior of a vehicle and hands on state of the driver.

An embodiment of the present disclosure provides a driver steering intent determining apparatus, capable of improving the reliability for an autonomous driving function by exactly determining the steering intent of a driver based on a hands on state in a stabilization state of a vehicle, a system having the same, and a method thereof.

Another embodiment of the present disclosure provides a driver steering intent determining apparatus, capable of exactly deciding the steering intent of a driver by performing state-shift control based on each situation as reference values are variously set to determine an autonomous driving control mode, the torque size of the steering by a driver, and a time for which the torque of the steering by the driver is consecutively generated in the state-shift to a standby state for the steering control by the driver, a system having the same, and a method thereof.

Technical problems to be solved by the present disclosure are not limited to the aforementioned problems, and any other technical problems not mentioned herein will be clearly understood from the following description by those skilled in the art to which the present disclosure pertains.

According to an embodiment of the present disclosure, an apparatus for determining a steering intent of a driver may include a processor to determine the steering intent of the driver based on sensing results of a stabilization state of a vehicle and hands on of the driver, and a storage to store a preset reference value to determine the steering intent of the driver.

According to an embodiment, the processor may determine the steering intent of the driver based on at least one of an autonomous driving control mode, a size of a driver steering torque, or a time for which the driver steering torque is consecutively generated.

According to an embodiment, the processor may shift a decision state of the steering intent of the driver from a standby state, which is a state that steering is controlled by the driver, to a start-up state when an autonomous driving control command is issued.

According to an embodiment, the processor may determine whether the vehicle is in the stabilization state in the start-up state, and shift the decision state of the steering intent of the driver to a hands on state or a hands off state based on the sensing result of the hands on of the driver, when the vehicle is in the stabilization state.

According to an embodiment, the processor may determine whether the vehicle is in the stabilization state, based on whether the vehicle is travelling within a preset threshold value from a center of a travelling road, or heading of the vehicle and a yaw rate value of the vehicle.

According to an embodiment, the processor may shift the hands on state or the hands off state to the hands off state or the hands on state, respectively, based on the sensing result of the hands on of the driver.

According to an embodiment, the processor may classify the autonomous driving control mode into a general autonomous driving control mode, a limited autonomous driving control mode, and a risk minimizing driving mode.

According to an embodiment, the processor may determine shifting of one of the start-up state, the hands on state, and the hands off state to the standby state, based on at least one of an autonomous driving control mode, a size of a driver steering torque, or a time for which the driver steering torque is consecutively generated.

According to an embodiment, the processor may increase a reference value to decide the size of the driver steering torque, and the time for which the driver steering torque is consecutively generated, based on a torque generated due to button manipulation and a reaction torque generated in a state the driver holds a steering wheel, under a situation that the autonomous driving control mode is a general driving control mode, when determining the shifting of the start-up state to the standby state.

According to an embodiment, the processor may decrease a reference value to decide the size of the driver steering torque, and the time for which the driver steering torque is consecutively generated, when the autonomous driving control mode is a limited autonomous driving control mode, and a risk minimizing driving mode, and when determining the shifting of the start-up state to the standby state.

According to an embodiment, the processor may increase a reference value to decide the size of the driver steering torque, and the time for which the driver steering torque is consecutively generated, based on an unintentional driver steering torque, under a situation that the autonomous driving control mode is a general driving control mode, when determining the shifting of the hands off state to the standby state.

According to an embodiment, the processor may decrease a reference value to decide the size of the driver steering torque, and the time for which the driver steering torque is consecutively generated, when the autonomous driving control mode is a limited autonomous driving control mode, and a risk minimizing driving mode, and when determining the shifting of the hands off state to the standby state.

According to an embodiment, the processor may decrease a reference value to decide the size of the driver steering torque, and the time for which the driver steering torque is consecutively generated, such that the driver controls the steering, under a situation that the autonomous driving control mode is a general driving control mode, when determining the shifting of the hands on state to the standby state.

According to an embodiment, the processor may decrease a reference value to decide the size of the driver steering torque, and the time for which the driver steering torque is consecutively generated, when the autonomous driving control mode is a limited autonomous driving control mode, and a risk minimizing driving mode, and when determining the shifting of the hands on state to the standby state.

According to another embodiment of the present disclosure, a vehicle system may include a driver steering intent determining apparatus to decide a steering intent of a driver, based on sensing results of a stabilization state of a vehicle and hands on of the driver, and a sensing device to sense a vehicle behavior for determining the stabilization state of the vehicle and sense a hands on state.

According to another aspect of the present disclosure, a method for determining a steering intent of a driver may include sensing a vehicle behavior for determining a stabilization state of a vehicle and sensing a hands on state of a driver, and determining the steering intent of the driver, based on sensing results of a stabilization state of the vehicle and hands on of the driver.

According to an embodiment, determining the steering intent of the driver may include shifting a decision state of the steering intent of the driver from a standby state, which is a state that steering is controlled by the driver, to a start-up state when an autonomous driving control command is issued, determining whether the vehicle is in the stabilization state in the start-up state, and shifting the decision state of the steering intent of the driver to a hands on state or a hands off state based on the sensing result of the hands on of the driver, when the vehicle is in the stabilization state.

According to another embodiment of the present disclosure, determining the steering intent of the driver may further include determining shifting of one of the start-up state, the hands on state, and the hands off state to the standby state, based on at least one of an autonomous driving control mode, a size of a driver steering torque, or a time for which the driver steering torque is consecutively generated.

According to another embodiment of the present disclosure, determining the shifting of one of the start-up state, the hands on state, and the hands off state to the standby state may include decreasing a reference value to decide the size of the driver steering torque, and the time for which the driver steering torque is consecutively generated, when the autonomous driving control mode is a limited autonomous driving control mode, and a risk minimizing driving mode.

According to another embodiment of the present disclosure, the method may further include increasing a reference value to decide the size of the driver steering torque, and the time for which the driver steering torque is consecutively generated, under a situation that the autonomous driving control mode is a general driving control mode, when determining the shifting of the start-up state or the hands off state to the standby state.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
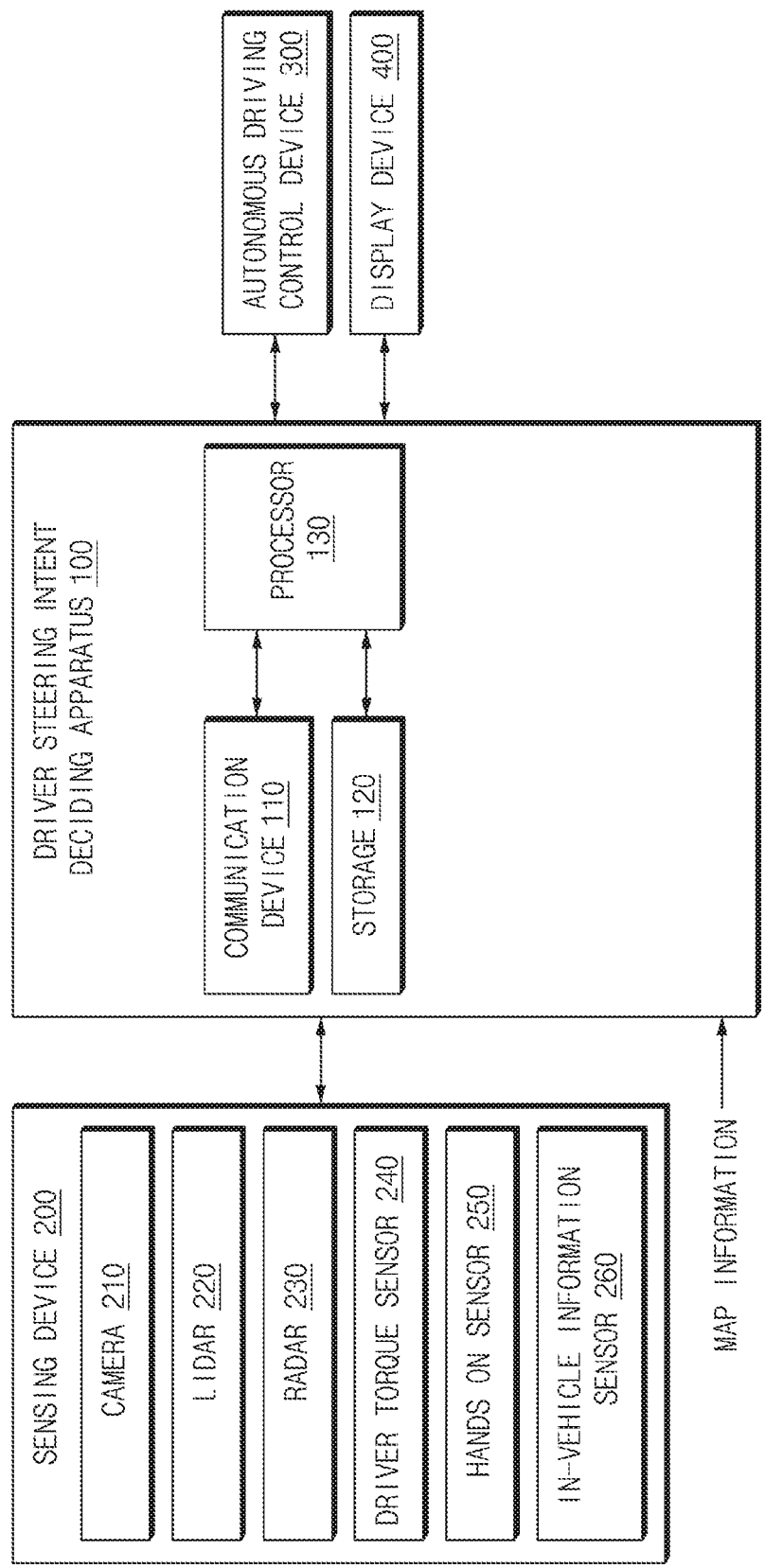
FIG. 1 is a block diagram illustrating the configuration of a vehicle system including a driver steering intent determining apparatus, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure include the configuration to prevent an autonomous driving function from being withdrawn due to the unintentional interference by a driver when the autonomous driving function is initially activated.

Hereinafter, embodiments of the present disclosure will be described in detail with reference to FIGS. 1 to 3.

FIG. 1 is a block diagram illustrating the configuration of a vehicle system including a driver steering intent determining apparatus, according to an embodiment of the present disclosure.

Referring to FIG. 1, according to an embodiment of the present disclosure, the vehicle system may include a driver steering intent determining apparatus 100, a sensing device 200, an autonomous driving control device 300, and a display device 400.

According to an embodiment of the present disclosure, the driver steering intent determining apparatus 100 may be implemented inside a vehicle. In this case, the driver steering intent determining apparatus 100 may be implemented integrally with internal control units of the vehicle. Alternatively, the driver steering intent determining apparatus 100 may be implemented separately from the internal control units of the vehicle and may be connected with the internal control units of the vehicle through an additional connection unit.

The driver steering intent determining apparatus 100 may determine the steering intent of the driver based on the stabilization state of the vehicle and the sensing result of the hands on state of the driver. In addition, the driver steering intent determining apparatus 100 may determine the steering intent of the driver based on at least one of an autonomous driving control mode, the size of the steering torque (driver steering torque) by a driver, or a time for which the driver steering torque is consecutively generated.

The driver steering intent determining apparatus 100 may increase a reference value to determine the steering intent of the driver, such that the autonomous driving control mode is prevented from being withdrawn when the torque of the unintentional steering by the driver is generated at the initial stage of the autonomous driving control mode (start-up state) or in a hands on state. In addition, the driver steering intent determining apparatus 100 may reduce the reference value to determine the steering intent of the driver such that the hands on state is rapidly shifted to the standby state. In addition, the driver steering intent determining apparatus 100 may perform a control operation for the rapid shift to the standby state by minimizing the reference value to determine the steering intent of the driver when urgently switching a control to the driver, for example, in a limited autonomous driving control mode or a risk minimizing driving mode.

The driver steering intent determining apparatus 100 may include a communication device 110, a storage 120, and a processor 130.

According to embodiments of the present disclosure, the communication device 110, which is a hardware device implemented with various electronic circuits to transmit or receive a signal through wireless or wired connection, may make V2I communication through an In-vehicle network communication technology or wireless Internet access or short range communication technology with an external server of a vehicle, an infrastructure, and other vehicles. In this case, the vehicle network communication technology may include a controller area network (CAN) communication technology, a local interconnect network (LIN) communication technology, or a Flex-Ray communication technology, and in-vehicle communication may be performed through the above communication technology. The wireless Internet technology may include a wireless LAN (WLAN), a wireless broadband (Wibro), a Wi-Fi, or World Interoperability for Microwave Access (Wimax). The short range communication technology may include Bluetooth, ZigBee, ultra wideband (UWB), radio frequency identification (RFID), or infrared data association (IrDA).

For example, the communication device 110 may share sensing information by making communication with the sensing device 200 in the vehicle. In this case, the sensing information may include vehicle behavior information, in-vehicle information, hands on information, or driver torque information.

The storage 120 may store the sensing result of the sensing device 200 and data and/or an algorithm necessary for the processor 130 to operate.

For example, the storage 150 may store a reference value to determine the steering intent of the driver, a reference value to decide the size of the driver steering torque, and a time for which the driver steering torque is consecutively generated. In this case, the reference value may be preset through an experiment, and may be increased or decreased by the processor 130 thereafter. The storage 150 may store a hands on state, the driver steering torque, or the vehicle behavior information, which is sensed by the sensing device 200.

The storage 120 may be implemented with at least one storage medium of a memory in a flash memory type, a hard disk type, a micro type, a type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, and/or an optical disk-type memory.

The processor 130 may be electrically connected with the communication device 110, and the storage 120, may electrically control each component, and may be an electric circuit that executes software commands. Accordingly, the processor 130 may perform various data processing and calculation, to be described below.

The processor 130 may process a signal transmitted between components of the driver steering intent determining apparatus 100. The processor 130 may be, for example, an electronic control unit (ECU), a micro controller unit (MCU), or another lower-level controller.

The processor 130 may determine the steering intent of the driver based on the stabilization state of the vehicle and the sensing result of the hands on state of the driver.

The processor 130 may determine the steering intent of the driver based on at least one of an autonomous driving control mode, the size of the driver steering torque, or a time for which the driver steering torque is consecutively generated.

The processor 130 may shift the decision state of the steering intent of the driver from a standby state, which is the state that the steering is controlled by the driver, to a start-up state when an autonomous driving control command is issued.

The processor 130 may determine whether the vehicle is in the stabilization state or in the start-up state. When the vehicle is in the stabilization state, the processor 130 may shift the state for determining the steering intent of the driver to the hands on state or a hands off state, based on the sensing result of the hands on state of the driver. In this case, the processor 130 may determine whether the vehicle is in the stabilization state, based on whether the vehicle is travelling within a preset threshold value from the center of the travelling road, or the heading of a vehicle relative to a route and a yaw rate value of the vehicle.

The processor 130 may shift the hands on state or the hands off state from the hands off state or the hands on state, respectively, based on the sensing result of the hands on of the driver.

The processor 130 may classify the autonomous driving control mode into a general autonomous driving control mode (Dynamic Driving Task; DDT), a limited autonomous driving control mode, and a driving mode for minimizing a danger. In other words, the autonomous driving control mode may be classified into the general autonomous driving control mode (Dynamic Driving Task; DDT) which is a general autonomous driving state, a limited autonomous driving control mode (Transition Demand; TD) for transmitting the request for the switch of a control to a driver as the autonomous driving is difficult, and a risk minimizing driving mode (Minimum Risk Maneuver; MRM) indicating a driving state for minimizing a danger.

The processor 130 may determine the shift to the standby state from any one of the start-up state, the hands on state, and the hands off state, based on at least one of the autonomous driving control mode, the size of the driver steering torque, or the time for which the driver steering torque is consecutively generated.

The processor 130 may increase the reference value to decide the size of the driver steering torque, and the time for which the driver steering torque is consecutively generated, based on a torque generated due to button manipulation and a reaction torque generated in the state the driver holds the steering wheel, under the situation that the autonomous driving control mode is the general driving control mode, when determining the shift from the start-up state to the standby state. In other words, the processor 130 shifts the standby state to the start-up state when the size of the driver steering torque and the time for which the driver steering torque is consecutively generated exceed reference values. In this case, since the reference values are increased, the state is not shifted with the driver steering torque, which is generated through simple manipulation.

When determining the shift from the start-up state to the standby state, and when the autonomous driving control mode is the limited driving control mode or the risk minimizing driving mode, the processor 130 may reduce the reference value for determining the size of the driver steering torque and the time for which the driver steering torque is consecutively generated. In other words, when the size of the driver steering torque and the time for which the driver steering torque is consecutively generated exceed reference values, the processor 130 shifts from the start-up state to the standby state. As the reference value is reduced, in the emergency situation, the processor 130 rapidly shifts from the start-up state to the standby state.

The processor 130 may prevent the rapid shift to the standby state by increasing the reference value to decide the size of the driver steering torque and a time for which the driver steering torque is consecutively generated, based on the unintentional driver steering torque, under the situation that the autonomous driving control mode is the general driving control mode, when determining the shift from the hands off state to the standby state. In other words, the processor 130 may prevent the hands off state from being shifted the standby state, as the driver accidentally touches the steering wheel or accidentally presses a multimedia button mounted on the steering wheel.

The processor 130 may decrease the reference value to decide the size of the driver steering torque, and a time for which the driver steering torque is consecutively generated, under the situation that the autonomous driving control mode is the limited driving control mode or the risk minimizing driving mode, when determining the shift from the hands off state to the standby state.

The processor 130 may decrease the reference value to decide the size of the driver steering torque, and the time for which the driver steering torque is consecutively generated, such that the driver controls the steering, under the situation that the autonomous driving control mode is the general driving control mode, when determining the shift from the hands on state to the standby state. In other words, the processor 130 may determine that the driver has a higher will to involve in steering, in the hands on state. Accordingly, the processor 130 may rapidly shift the hands on state to the standby state by decreasing the reference value such that the driver controls the steering.

The processor 130 may decrease the reference value to decide the size of the driver steering torque, and a time for which the driver steering torque is consecutively generated, when determining the shift from the hands on state to the standby state, and when the autonomous driving control mode is the limited driving control mode or the risk minimizing driving mode.

The sensing device 200 may include a camera 210, a Lidar 220, a radar 230, a driver torque sensor 240, a hands on sensor 250, and an in-vehicle information sensor 260.

The camera 210 may photograph information on vehicle surroundings information. The Lidar 220 and the radar 230 may detect obstacles around the vehicle. In other words, the camera 210, the Lidar 220, and the radar 230 may include at least one sensor to detect an obstacle positioned around the vehicle, for example, a proceeding vehicle and may measure the distance to the obstacle and/or the relative speed to the obstacle. Accordingly, the processor 130 may determine the vehicle behavior state (stabilization state) using information obtained through the camera 210, the Lidar 220, and the radar 230 and map information (information on the position of the host vehicle and information on a lane).

The driver torque sensor 240 may sense a steering torque value by the driver.

The hands on sensor 250 may sense whether the hand of the driver is positioned on the steering wheel. In this case, the hands on sensor 250 may include a contact sensor, and the processor 130 may determine hands on or hands off by applying the result received from the hands on sensor 250 to hysteresis.

The in-vehicle information sensor 260 may sense in-vehicle information, such as a vehicle speed or a yaw rate. To this end, the in-vehicle information sensor 260 may include an ultrasonic sensor, a laser scanner, an acceleration sensor, a yaw rate sensor, a torque measurement sensor and/or a wheel speed sensor, or a steering angle sensor.

The sensing device 200 may include a plurality of sensors to sense an external object of the vehicle and may obtain information on the position of the external object, the speed of the external object, the moving direction of the external object, and/or the type of the external object (e.g., information on a vehicle, a pedestrian, a bicycle, or a motorcycle).

The driver steering intent determining apparatus 100 may be configured to control the steering (longitudinal, transverse), a speed, braking, or engine driving of the vehicle, and may include a steering wheel, an actuator operating together with the steering wheel, a controller to control the actuator, a controller to control a brake, and a controller to control the speed of the vehicle.

The driver steering intent determining apparatus 100 may perform autonomous driving control and the autonomous driving control may include the control of a vehicle speed, the steering of the vehicle, and the braking of the vehicle.

The display device 400 may include an input device to receive a control command from a user and an output device to output an operation state and an operating result of the driver steering intent determining apparatus 100. In this case, the input device may include a key button, and may include a mouse, a joystick, a jog shuttle, or a stylus pen. The input device may include soft keys implemented on a display. The output device may include a display, and may include a voice output device such as a speaker. In this case, when a touch sensor, such as a touch film, a touch sheet, or a touch pad, is provided on the display, the display may operate in the form of a touch screen, and the input device and the output device may be implemented in the integral form. According to the present disclosure, the output device may output information on the determination result of the steering intent of the driver and the autonomous driving control mode.

In this case, the display may include at least one of a liquid crystal display (LCD), a thin film transistor-liquid crystal display (TFT LCD), an organic light-emitting diode (OLED), a flexible display, a field emission display (FED), or a three dimensional display (3D display).

Figure 2:
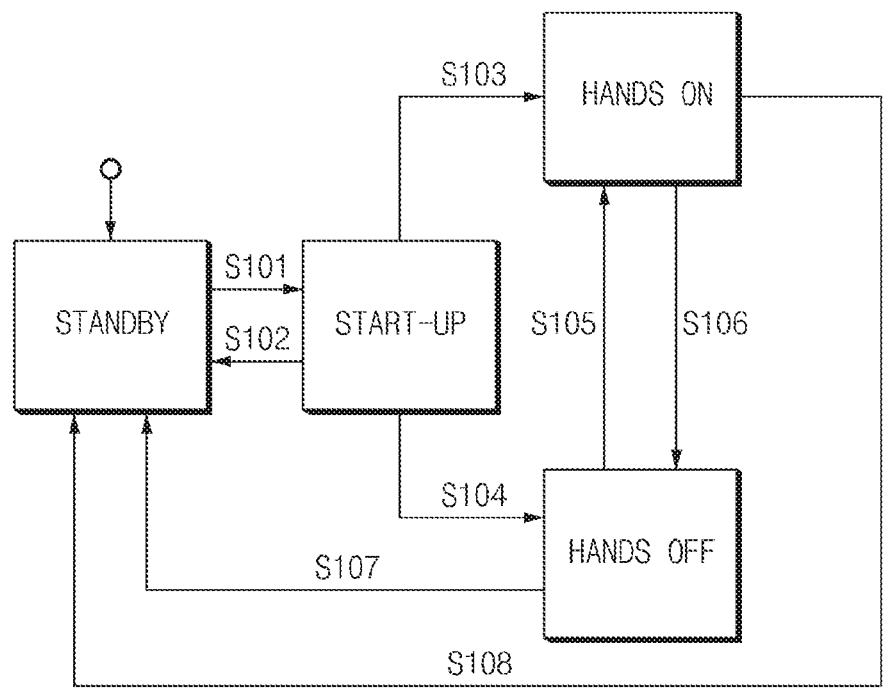
FIG. 2 is a view illustrating the state-shift for the steering intent of a driver, according to an embodiment of the present disclosure.

FIG. 2 is a view illustrating a state-shift for the steering intent of a driver, according to an embodiment of the present disclosure.

The driver steering intent determining apparatus 100 may shift the state for the steering intent of the driver based on the determination result of the steering intent of the driver as illustrated in FIG. 2.

The standby state, in which the autonomous driving system stands by until the autonomous driving control command is issued, refers to a state that a control operation is performed depending on the steering by the driver.

The start-up state, the hands on state, and the hands off state are states in which a transverse control operation is performed by the driver steering intent determining apparatus 100 as the autonomous driving is started. In each of the start-up state, the hands on state, and the hands off state, the steering intent of the driver may be determined depending on each relevant condition.

The steering wheel torque may be generated by the driver in the state that the autonomous driving function is activated by the driver steering intent determining apparatus 100. In addition, as the steering control operation is performed by the driver steering intent determining apparatus 100 of the vehicle before the driver relinquishes control of the steering, the steering intent of the driver may be overlapped with the steering intent of the driver steering intent determining apparatus 100, so the overlapped steering may occur.

Therefore, according to embodiments of the present invention, the driver steering intent determining apparatus 100 may define an initial start-up state and may shift to a next state (a hands on state or hands off state) depending on the condition of determining the stabilization of the vehicle behavior. In other words, the driver steering intent determining apparatus 100 may shift, to the hands on state or the hands off state, the state for the steering intent of the driver, based on information of the hands on sensor 250 after the behavior of the vehicle is stabilized.

Hereinafter, the autonomous driving control mode may be classified into a general autonomous driving control mode (Dynamic Driving Task; DDT) which is a general autonomous driving state, a limited autonomous driving control mode (Transition Demand; TD) for transmitting the request for the switch of a control to a driver as the autonomous driving is difficult, and a risk minimizing driving mode (Minimum Risk Maneuver; MRM) indicating a driving state for minimizing a danger. The driver steering intent determining apparatus 100 may control the shift of the state for the steering intent of the driver depending on the above-described autonomous driving control mode, the vehicle behavior (stabilization state), or the result of the hands on sensor.

The driver steering intent determining apparatus 100 may shift the standby state to the start-up state when a transverse command request is made from an upper-level controller (S101).

The state of the driver steering intent determining apparatus 100 may be shifted from the start-up state to the standby state under DDT & (Torque/Duration Condition ①) or TD/MRM & (Torque/Duration Condition ④)) (S102).

When a driver manipulates a steering wheel button or holds a steering wheel in the start-up state during the DDT mode, a reaction torque is generated. Accordingly, the DDT mode may be withdrawn and the start-up state may be shifted to the standby state. In this case, the driver steering intent determining apparatus 100 may shift the start-up state to the standby state when the size of the driver steering torque and the time for which the driver steering torque is consecutively generated exceed preset reference values by the driver at the initial stage. In this case, the first reference value for determining the size of the driver steering torque and the time for which the driver steering torque is consecutively generated is not set based on the reaction torque generated as the driver manipulates the steering wheel button or holds the steering wheel during the DDT mode. Accordingly, although smaller steering torque is made by the driver during the DDT mode, the DDT mode may be easily withdrawn.

In this case, the driver steering intent determining apparatus 100 may set a second reference value for determining the size of the driver steering torque and the time for which the driver steering torque is consecutively generated based on the torque generated due to the manipulation of the steering wheel button or the reaction torque generated due to steering when the driver holds the steering wheel at the initial stage, in the start-up state. In this case, the driver steering intent determining apparatus 100 sets the second reference value to be higher than the first reference value to prevent the autonomous driving control mode from being randomly easily withdrawn due to the driver steering toque generated due to the simple manipulation having no steering intent during the DDT mode in the start-up state. Torque/Duration Condition ① refers to the steering intent of the driver being determined based on the second reference value.

In addition, when it is necessary to urgently switch the control to the driver during TD/MRM mode in the start-up state, the driver steering intent determining apparatus 100 may set a third reference value for determining the size of the driver steering torque and the time for which the driver steering torque is consecutively generated, and the third reference value may be set to be significantly lower than the first reference value and the second reference value. In other words, since the control has to be rapidly transferred to the driver in the emergency situation, the third reference value may be set to be the smallest value such that the start-up state is rapidly shifted to the standby state. Torque/Duration Condition ④ refers to the steering intent of the driver may be determined based on the third reference value.

The driver steering intent determining apparatus 100 may shift the start-up state to the hands on state, when the vehicle behavior is in the stabilization state and the driver is in the hands on state (S103). In this case, the driver steering intent determining apparatus 100 may determine the stabilization state of the vehicle integrally by the stabilization of a vehicle dynamic signal such as the heading of a vehicle relative to a route and a yaw rate value of the vehicle when the vehicle is travelling within a preset threshold value from the center of the travelling road.

The driver steering intent determining apparatus 100 may shift the start-up state to the hands off state, when the vehicle behavior is in the stabilization state and the driver is in the hands off state (S104). In this case, the driver steering intent determining apparatus 100 may determine the steering intent of the driver depending on the size of the driver steering torque, the time for which the driver steering torque is consecutively generated, and an upper-level driving state of the autonomous driving vehicle.

The driver steering intent determining apparatus 100 may shift the hands off state to the hands on state when the hands on state of the driver is sensed (S105).

The driver steering intent determining apparatus 100 may shift the hands on state to the hands off state when the hands off state of the driver is determined (S106).

The driver steering intent determining apparatus 100 may shift the hands off state to the standby state under DDT & (Torque/Duration Condition ②) or TD/MRM & (Torque/Duration Condition ④) (S107).

When the steering torque is generated as the driver performs simple manipulation without intending to steer the vehicle by manipulating the multimedia button or by colliding with the steering wheel due to the movement of the driver while driving the vehicle in the hands off state and the DDT mode, the simple manipulation may be determined as an intent to steer by the driver, so the DDT mode may be withdrawn. To prevent the DDT mode from being withdrawn, a fourth reference value may be set to determine the size of the driver steering torque and the time for which the driver steering torque is consecutively generated when the hands off state is shifted to the standby state. The fourth reference value may be set to the highest size among the first reference value, the second reference value, and the third reference value. In other words, the driver steering intent determining apparatus 100 may prevent the hands off state from being easily shifted to the standby state through the simple manipulation or the mistake of the driver by setting the fourth reference value to be higher such that the size of the driver steering torque and the time for which the driver steering torque is consecutively generated are prevented from easily exceeding the fourth reference value in the hands off state and in the DDT mode. Torque/Duration Condition ② refers to the steering intent of the driver being determined based on the fourth reference value.

In addition, when it is necessary to urgently switch the control to the driver during TD/MRM mode in the hands off state, the driver steering intent determining apparatus 100 may set the third reference value for determining the size of the driver steering torque and the time for which the driver steering torque is consecutively generated, and the third reference value may be set to be lower than the first reference value and the second reference value. In other words, since the control has to be rapidly transferred to the driver under the emergency situation, the third reference value may be set to be the smallest value such that the start-up state is rapidly shifted to the standby state.

The driver steering intent determining apparatus 100 may shift a state from the hands on state to the standby state under DDT & (Torque/Duration Condition ③) or TD/MRM & (Torque/Duration Condition ④) (S108).

As it is determined that the driver has a higher will for steering by involving in the steering in the hands on state, a fifth reference value may be set to determine the size of the driver steering torque and the time for which the driver steering torque is consecutively generated, such that the hands on state is easily shifted to the standby state. The fifth reference value may be set to be lower than the first reference value, the second reference value, and the fourth reference value. In this case, the fifth reference value may be set to be equal to or greater than the third reference value. Torque/Duration Condition ③ refers to the steering intent of the driver being determined based on the fifth reference value.

In addition, when it is necessary to urgently switch the control to the driver during TD/MRM mode in the hands on state, the driver steering intent determining apparatus 100 may set the third reference value for determining the size of the driver steering torque and the time for which the driver steering torque is consecutively generated, and the third reference value may be set to be lower than the first reference value, the second reference value, and the fourth reference value. In other words, since the control has to be rapidly transferred to the driver under the emergency situation, the third reference value may be set to be the smallest value such that the start-up state is rapidly shifted to the standby state.

As described above, according to embodiments of the present disclosure, the autonomous driving control mode may be prevented from being withdrawn due to the unintentional interference of the driver when the autonomous driving control mode is initially activated.

In addition, according to embodiments of the present disclosure, the hands on or the hands off is determined in the state that the behavior of the vehicle is stabilized. Accordingly, the steering intent of the driver may be clearly determined, so the reliability for the autonomous driving system may be improved.

Figure 3:
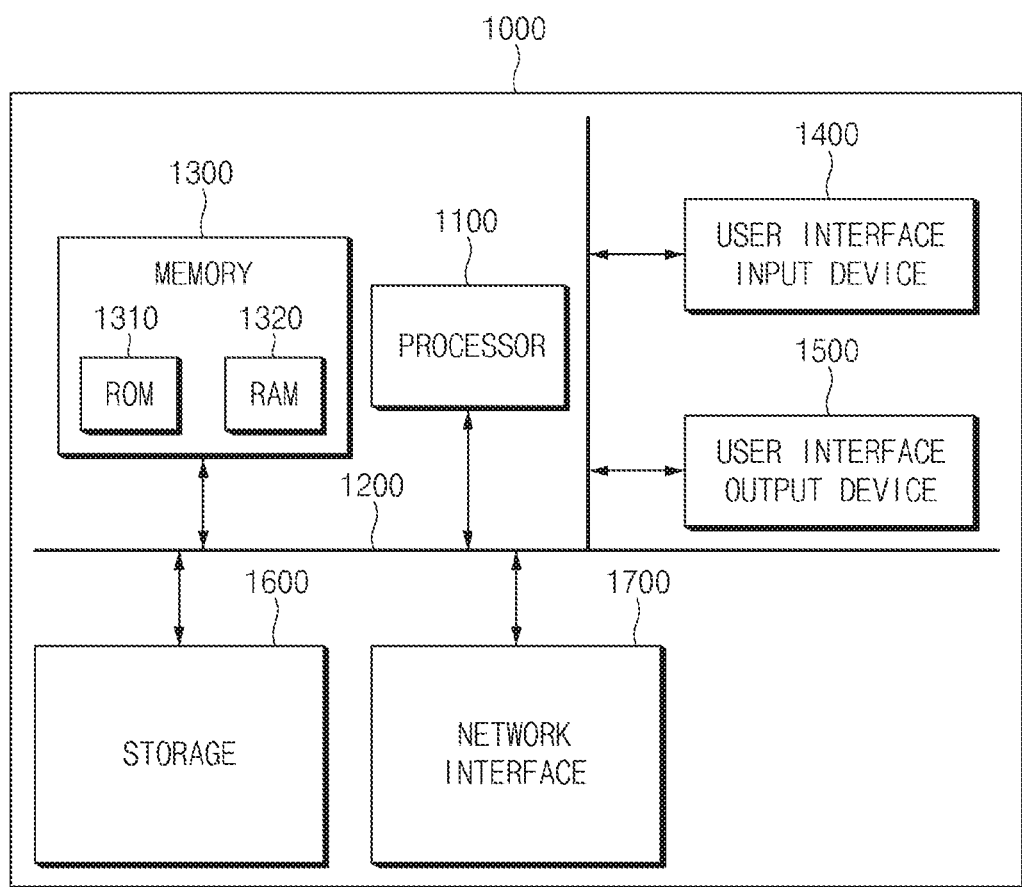
FIG. 3 is a computing system, according to an embodiment of the present disclosure.

FIG. 3 illustrates a computing system, according to an embodiment of the present disclosure.

Referring to FIG. 3, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a driver terminal. Alternatively, the processor and the storage medium may reside as separate components of the driver terminal.

According to embodiments of the present disclosure, the reliability for an autonomous driving function may be improved by exactly determining the steering intent of a driver based on a hands on state in a stabilization state of a vehicle.

In addition, according to embodiments of the present disclosure, the steering intent of a driver may be exactly determined by controlling the state-shift based on each situation, as reference values are variously set to determine the autonomous driving control mode, the torque size of the steering by a driver, and the time for which the driver steering torque is consecutively generated in the state-shift to the standby state for the steering control by the driver.

Besides, a variety of effects directly or indirectly understood through the disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure are not limited by the embodiments. The scope of the present disclosure should be construed on the basis of the accompanying claims, and all the technical ideas within the scope equivalent to the claims should be included in the scope of the present disclosure.

What is claimed is:

1. A vehicle comprising:
   a steering wheel;
   a sensor;
   a processor configured to:
      determine whether the vehicle is in a stabilization state by sensing a behavior of the vehicle;
      determine a steering intent indicating whether a driver of the vehicle intends to steer the vehicle based on sensing results from the sensor, the sensing results indicating whether a hand of the driver is positioned on the steering wheel of the vehicle when the vehicle is in the stabilization state;
      operate the vehicle by steering the vehicle based on the steering intent of the driver; and
      increase reference values to decide a size of a driver steering torque, and a time for which driver steering torque is consecutively generated, based on a torque generated due to button manipulation and a reaction torque generated in a state the driver holds the steering wheel, under a situation that an autonomous driving control mode is a general driving control mode, when determining a shifting of a start-up state to a standby state; or
      decrease the reference values to decide the size of the driver steering torque, and the time for which the driver steering torque is consecutively generated, such that the driver controls the steering, under a situation that the autonomous driving control mode is the general driving control mode, when determining the shifting of the hands on state to the standby state; and
   a memory configured to store a preset reference value to determine the steering intent of the driver.

2. The vehicle of claim 1, wherein the processor is configured to determine the steering intent of the driver based on at least one of the autonomous driving control mode, the size of the driver steering torque, or the time for which the driver steering torque is consecutively generated.

3. The vehicle of claim 2, wherein the processor is configured to determine the steering intent of the driver based on the autonomous driving control mode and to classify the autonomous driving control mode into the general driving control mode, a limited autonomous driving control mode, or a risk minimizing driving mode.

4. The vehicle of claim 1, wherein the processor is configured to shift a decision state of the steering intent of the driver from the standby state, which is a state that the steering is controlled by the driver, to the start-up state when an autonomous driving control command is issued.

5. The vehicle of claim 4, wherein the processor is configured to:
   determine whether the vehicle is in the stabilization state or the start-up state; and
   shift the decision state of the steering intent of the driver to the hands on state or a hands off state based on the sensing results of the hands on of the driver, when the vehicle is in the stabilization state.

6. The vehicle of claim 5, wherein the processor is configured to determine whether the vehicle is in the stabilization state based on whether the vehicle is travelling within a preset threshold value from a center of a travelling road, or based on a heading of the vehicle and a yaw rate value of the vehicle.

7. The vehicle of claim 5, wherein the processor is configured to shift the hands on state or the hands off state to the hands off state or the hands on state, respectively, based on the sensing result of the hands on of the driver.

8. The vehicle of claim 5, wherein the processor is configured to determine shifting of one of the start-up state, the hands on state, or the hands off state to the standby state, based on at least one of the autonomous driving control mode, the size of the driver steering torque, or the time for which the driver steering torque is consecutively generated.

9. The vehicle of claim 8, wherein the processor is configured to decrease the reference values to decide the size of the driver steering torque, and the time for which the driver steering torque is consecutively generated, when the autonomous driving control mode is a limited autonomous driving control mode, or a risk minimizing driving mode, and when determining the shifting of the start-up state to the standby state.

10. The vehicle of claim 8, wherein the processor is configured to increase the reference values to decide the size of the driver steering torque, and the time for which the driver steering torque is consecutively generated, based on an unintentional driver steering torque, under the situation that the autonomous driving control mode is the general driving control mode, when determining the shifting of the hands off state to the standby state.

11. The vehicle of claim 8, wherein the processor is configured to decrease the reference values to decide the size of the driver steering torque, and the time for which the driver steering torque is consecutively generated, when the autonomous driving control mode is a limited autonomous driving control mode, or a risk minimizing driving mode, and when determining the shifting of the hands off state to the standby state.

12. The vehicle of claim 8, wherein the processor is configured to:
   decrease the reference values to decide the size of the driver steering torque, and the time for which the driver steering torque is consecutively generated, when the autonomous driving control mode is a limited autonomous driving control mode, or a risk minimizing driving mode, and when determining the shifting of the hands on state to the standby state.

13. A vehicle system for a vehicle, the vehicle system comprising:
 a sensing device configured to:
  sense a vehicle behavior for determining a stabilization state of the vehicle; and
  sense a hands on state of a driver on a steering wheel of the vehicle;
 a driver steering intent determining apparatus configured to determine a steering intent of the driver, wherein the steering intent is based on sensing results of the hands on state of the driver on the steering wheel of the vehicle when the vehicle is in the stabilization state as determined by the vehicle behavior; and
  increase reference values to decide a size of a driver steering torque, and a time for which driver steering torque is consecutively generated, based on a torque generated due to button manipulation and a reaction torque generated in a state the driver holds the steering wheel, under a situation that an autonomous driving control mode is a general driving control mode, when determining a shifting of a start-up state to a standby state; or
  decrease the reference values to decide the size of the driver steering torque, and the time for which the driver steering torque is consecutively generated, such that the driver controls steering, under a situation that the autonomous driving control mode is the general driving control mode, when determining the shifting of the hands on state to the standby state; and
 an autonomous driving control device configured to operate the vehicle by steering the vehicle based on the steering intent of the driver.

14. The vehicle system of claim 13, wherein the driver steering intent determining apparatus is configured to determine whether the vehicle is in the stabilization state based on whether the vehicle is travelling within a preset threshold value from a center of a travelling road, or based on a heading of the vehicle and a yaw rate value of the vehicle.

15. A method for operating a vehicle, the method comprising:
 determining a stabilization state of the vehicle by sensing a vehicle behavior of the vehicle;
 sensing a hands on state of a driver on a steering wheel of the vehicle;
 determining a steering intent of the driver, based on sensing results of the hands on state of the driver when the vehicle is in the stabilization state;
 operating the vehicle by steering the vehicle based on the steering intent of the driver; and
  increase reference values to decide a size of a driver steering torque, and a time for which driver steering torque is consecutively generated, based on a torque generated due to button manipulation and a reaction torque generated in a state the driver holds the steering wheel, under a situation that an autonomous driving control mode is a general driving control mode, when determining a shifting of a start-up state to a standby state; or
  decrease the reference values to decide the size of the driver steering torque, and the time for which the driver steering torque is consecutively generated, such that the driver controls the steering, under a situation that the autonomous driving control mode is the general driving control mode, when determining the shifting of the hands on state to the standby state.

16. The method of claim 15, wherein determining the steering intent of the driver includes:
 shifting a decision state of the steering intent of the driver from the standby state, which is a state that the steering is controlled by the driver, to the start-up state when an autonomous driving control command is issued;
 determining whether the vehicle is in the stabilization state or in the start-up state; and
 shifting the decision state of the steering intent of the driver to the hands on state or a hands off state based on the sensing results of the hands on state of the driver, when the vehicle is in the stabilization state.

17. The method of claim 16, wherein determining the steering intent of the driver further includes determining shifting of one of the start-up state, the hands on state, or the hands off state to the standby state, based on at least one of the autonomous driving control mode, the size of the driver steering torque, or the time for which the driver steering torque is consecutively generated.

18. The method of claim 17, wherein determining the shifting comprises decreasing the reference values to decide the size of the driver steering torque, and the time for which the driver steering torque is consecutively generated, when the autonomous driving control mode is a limited autonomous driving control mode, or a risk minimizing driving mode.

19. The method of claim 17, further comprising increasing the reference values to decide the size of the driver steering torque, and the time for which the driver steering torque is consecutively generated, under the situation that the autonomous driving control mode is the general driving control mode, when determining the shifting of the start-up state or the hands off state to the standby state.

20. The method of claim 16, further comprising determining whether the vehicle is in the stabilization state based on whether the vehicle is travelling within a preset threshold value from a center of a travelling road, or based on a heading of the vehicle and a yaw rate value of the vehicle.

* * * * *